US012682526B2

(12) United States Patent (10) Patent No.: US 12,682,526 B2
Imai et al. (45) Date of Patent: Jul. 14, 2026

(54) IMAGE GENERATION DEVICE, MEDICAL DEVICE, AND STORAGE MEDIUM

(71) Applicant: GE Precision Healthcare LLC, Wauwatosa, WI (US)

(72) Inventors: Yasuhiro Imai, Hino (JP); Yuri Teraoka, Hino (JP); Ayako Matsumi, Hino (JP); Miyo Hattori, Hino (JP)

(73) Assignee: GE Precision Healthcare LLC, Wauwatosa, WI (US)

( * ) Notice: Subject to any disclaimer, the term of this patent is extended or adjusted under 35 U.S.C. 154(b) by 530 days.

(21) Appl. No.: 18/182,911

(22) Filed: Mar. 13, 2023

(65) Prior Publication Data

US 2023/0290022 A1 Sep. 14, 2023

(30) Foreign Application Priority Data

Mar. 14, 2022 (JP) ................................. 2022-039750

(51) Int. Cl.
G06T 12/30 (2026.01)
(52) U.S. Cl.
CPC .......... G06T 12/30 (2026.01); G06T 2210/41 (2013.01)
(58) Field of Classification Search
CPC . G06T 11/008; G06T 2210/41; G06T 11/005; G06T 11/006; A61B 6/037; A61B 6/52; A61B 6/5229; A61B 6/032; A61B 6/482; A61B 6/4241
USPC ....................................................... 382/131
See application file for complete search history.

(56) References Cited

U.S. PATENT DOCUMENTS

| | | | | | |
|---|---|---|---|---|---|
| 2015/0348289 | A1* | 12/2015 | Ida et al. | .............. | G06T 11/003 |
| 2020/0082579 | A1* | 3/2020 | Sekiya et al. | ......... | G06T 11/005 |
| 2020/0234471 | A1* | 7/2020 | Lu et al. | .............. | G06T 11/005 |
| 2021/0007691 | A1* | 1/2021 | Verleker et al. | ....... | A61B 6/482 |
| 2021/0007695 | A1* | 1/2021 | Lu et al. | .............. | A61B 6/5205 |
| 2021/0012543 | A1* | 1/2021 | Hein et al. | ............ | G06T 11/008 |
| 2021/0267563 | A1* | 9/2021 | Sattarivand et al. | .. | A61B 6/482 |
| 2022/0172365 | A1* | 6/2022 | Kawamara et al. | .. | G06T 7/0012 |

OTHER PUBLICATIONS

"Dual-energy Computed Tomography Imaging from Contrast-enhanced Single-energy Computed Tomography", by Wei Zhao et al., published Oct. 25, 2020 in Cornell University Library arXiv.org, ARXIV ID:2010.13253 (Year: 2020).*

* cited by examiner

*Primary Examiner* — Matthew C Bella
*Assistant Examiner* — Daniel Joseph Santos

(57) ABSTRACT

A computed tomography (CT) system with one or a plurality of processors to perform operations. The operations include reconstructing a series of virtual monochromatic X-ray images of the first energy and a series of virtual monochromatic X-ray images of the second energy based on data collected from an imaging subject, inputting the input image generated based on the reconstructed virtual monochromatic X-ray images of the second energy to the trained model and using the trained model to infer a series of virtual monochromatic X-ray image of the first energy, and generating a corrected series of virtual monochromatic X-ray images of the first energy based on the first reconstructed series of virtual monochromatic X-ray images of the first energy and the inferred series of virtual monochromatic X-ray images of the first energy.

13 Claims, 10 Drawing Sheets

Region R2
Pixels P21 to P2b
(v < TH1 or TH2 < v)

a1

Region R1
Pixels P11 to P1a
(TH1 ≤ v ≤ TH2)

G2                              G1                              G2 v<TH1                    TH1≦v≦TH2                    TH2<v

CT value v (HU)

-1000                    TH₁          0          TH₂

(b)

(a)

IMAGE GENERATION DEVICE, MEDICAL DEVICE, AND STORAGE MEDIUM

This application claims priority to Japanese Application No. 2022-039750, filed on Mar. 14, 2022, the disclosure of which is incorporated herein by reference in its entirety.

TECHNICAL FIELD

The present invention relates to an image generation device for generating virtual monochromatic X-ray images of an imaging subject, a medical device including said image generation device, and a storage medium containing instructions for generating virtual monochromatic X-ray images of an imaging subject.

BACKGROUND

A CT device is known as a medical device that noninvasively images a specimen. CT devices are widely used in hospitals and other medical facilities because they can acquire tomographic images of a specimen in a short scanning time.

The CT device applies a prescribed voltage to the cathode-anode tube of an X-ray tube to generate X-rays. The generated X-rays penetrate the specimen and are detected by the detector. The CT device reconstructs a CT image of the specimen based on the data detected by the detector.

SUMMARY

Single energy CT (SECT) is a well-known imaging technique for CT devices. SECT is a method of obtaining CT images of a specimen by applying a prescribed voltage (for example, 120 kVp) to the cathode-anode tube of the X-ray tube to generate X-rays. However, in SECT, CT values may be close even for different substances, and identification of different substances may be difficult.

Therefore, DECT (Dual Energy CT) technology is being researched and developed. DECT is a technique that uses X-rays in different energy regions to distinguish materials, and DECT-compatible CT devices are commercially available. The DECT technique has a wide range of applications and can be used, for example, to reconstruct virtual monochromatic X-ray images at each energy.

On the other hand, many medical institutions have not yet installed DECT-compatible CT equipment. Therefore, to provide diagnosis using virtual monochromatic X-ray images even to medical institutions that do not have DECT-compatible CT devices, technologies to infer virtual monochromatic X-ray images from images acquired by SECT using deep learning have also been researched and developed.

However, for virtual monochromatic X-ray images reconstructed with the DECT technique, there is a problem that image quality deteriorates due to the fundamental properties of DECT (for example, increase in noise and deterioration in image texture) when creating low-energy virtual monochromatic X-ray images.

Therefore, a technology that can provide virtual monochromatic X-ray images with reduced image quality degradation is desired.

The first aspect of the present invention is an image generation device including one or a plurality of processors that perform operations including reconstructing a virtual monochromatic X-ray image of the first energy and a virtual monochromatic X-ray image of the second energy based on data collected from the imaging subject, inputting the input image created based on the reconstructed virtual monochromatic X-ray image of the second energy into a trained model, inferring the virtual monochromatic X-ray image of the first energy using the trained model, and generating a corrected virtual monochromatic X-ray image of the first energy based on the reconstructed virtual monochromatic X-ray image of the first energy and the inferred virtual monochromatic X-ray image of the first energy.

In addition, the second aspect of the present invention is a medical device including one or a plurality of processors that perform operations including reconstructing a virtual monochromatic X-ray image of the first energy and a virtual monochromatic X-ray image of the second energy based on data collected from the imaging subject, inputting the input image created based on the reconstructed virtual monochromatic X-ray image of the second energy into a trained model, inferring the virtual monochromatic X-ray image of the first energy using the trained model, and generating a corrected virtual monochromatic X-ray image of the first energy based on the reconstructed virtual monochromatic X-ray image of the first energy and the inferred virtual monochromatic X-ray image of the first energy.

The third aspect of the present invention is a storage medium readable by a computer and non-transitory containing one or more instructions executable by one or more processors, wherein the one or more instructions instruct the one or more processors to perform operations including reconstructing a virtual monochromatic X-ray image of the first energy and a virtual monochromatic X-ray image of the second energy based on the data collected from the imaging subject, creating an input image based on the reconstructed virtual monochromatic X-ray image of the second energy, inputting the input image to a trained model and use the trained model to infer a virtual monochromatic X-ray image of the first energy, and generating a corrected virtual monochromatic X-ray image of the first energy based on the reconstructed virtual monochromatic X-ray image of the first energy and the inferred virtual monochromatic X-ray image of the first energy.

When inferring a first energy virtual monochromatic X-ray image based on a reconstructed virtual monochromatic X-ray image of the second energy, the inferred virtual monochromatic X-ray image of the first energy tends to be influenced by the image quality of the virtual monochromatic X-ray image of the second energy. Therefore, by using an image with better image quality than the reconstructed virtual monochromatic X-ray image of the first energy as the reconstructed virtual monochromatic X-ray image of the second energy, the inferred virtual monochromatic X-ray image of the first energy can inherit the favorable image quality of the virtual monochromatic X-ray image of the second energy. With this in mind, by inferring the first energy virtual monochromatic X-ray image based on the reconstructed virtual monochromatic X-ray image of the second energy, a first energy virtual monochromatic X-ray image that was at low image quality can be inferred with improved quality from the reconstructed virtual monochromatic X-ray image of the first energy.

Thus, the present invention has the ability to infer a virtual monochromatic X-ray image of the first energy with improved quality for the regions that were low quality in the reconstructed virtual monochromatic X-ray image of the first energy. Therefore, by generating a corrected virtual monochromatic X-ray image of the first energy based on the reconstructed virtual monochromatic X-ray image of the first energy and inferred virtual monochromatic X-ray image of the first energy, a virtual monochromatic X-ray image of the first energy with improved image quality can be obtained.

DETAILED DESCRIPTION

An embodiment for carrying out the invention will be described below, but the present invention is not limited to the following embodiment.

Figure 1:
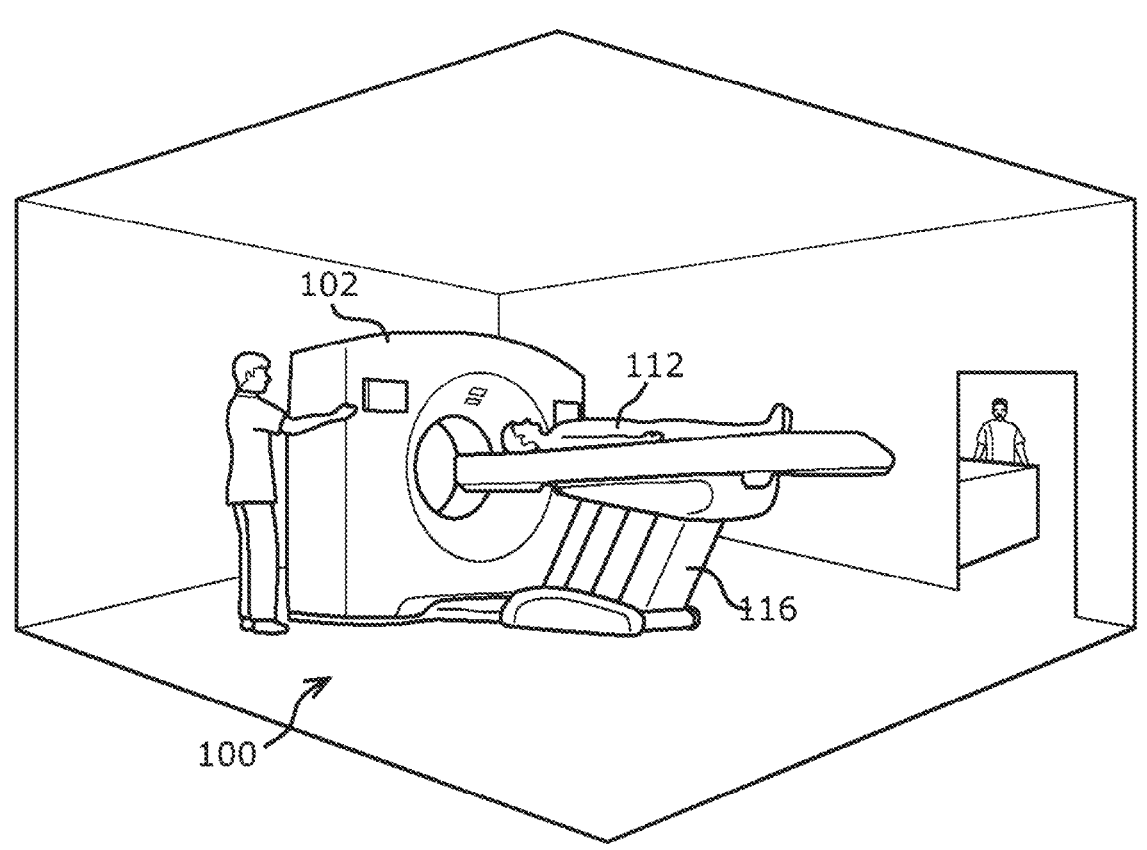
FIG. 1 is a perspective view of the CT system 100 of an example embodiment.
Figure 2:
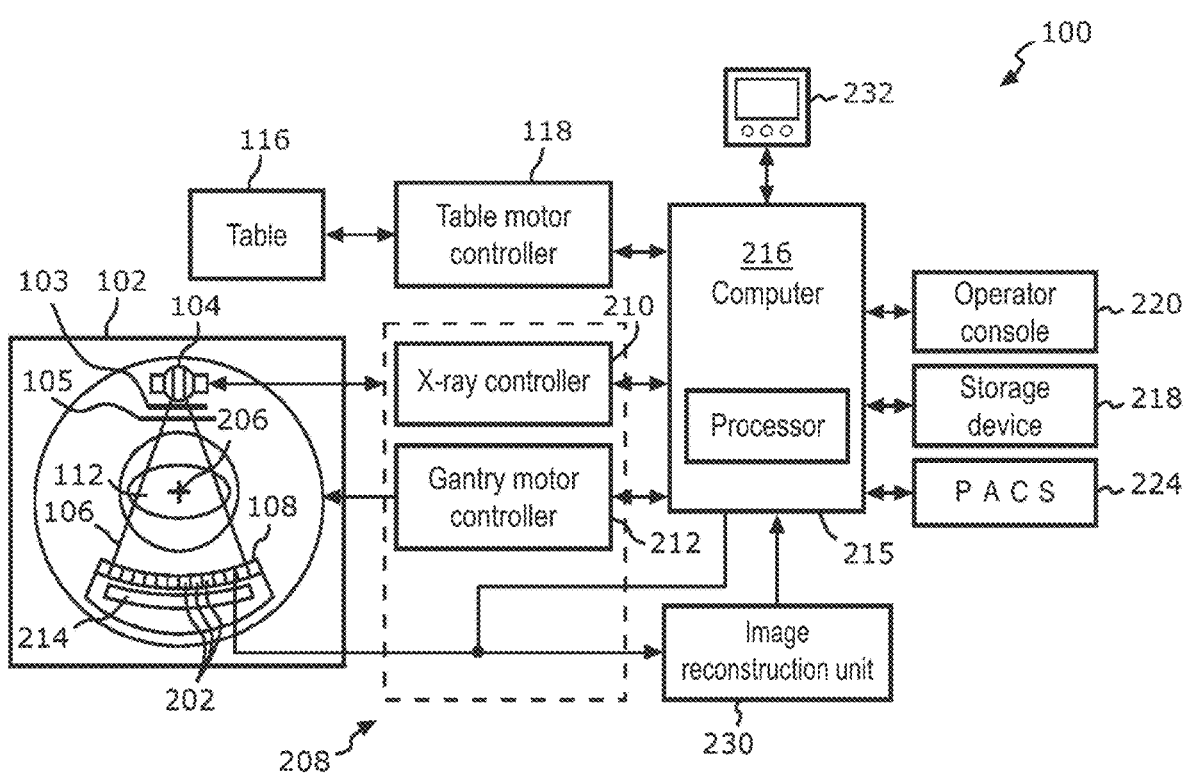
FIG. 2 is a block diagram of the CT system 100 of the present example embodiment.

FIG. 1 is a perspective view of the CT system 100 in an example embodiment. FIG. 2 is a block diagram of the CT system 100 in the present example embodiment. The CT system 100 has a gantry 102. The gantry 102 has an opening through which an imaging subject 112 is transported to scan the imaging subject 112. The gantry 102 is equipped with an X-ray tube 104, a filter part 103, a front collimator 105, and a detector array 108. The X-ray tube 104 generates X-rays when a prescribed voltage is applied to the cathode-anode tube. In the example embodiment, the X-ray tube 104 is an X-ray tube compatible with the Rapid kV switching system. The filter part 103 includes, for example, a flat plate filter and/or a bow-tie filter. The front collimator 105 is a component that narrows the X-ray irradiation range so that X-rays are not emitted in unwanted areas.

The detector array 108 includes a plurality of detector elements 202. A plurality of detector elements 202 detect the X-ray beam 106 that is emitted from the X-ray tube 104 and passes through an imaging subject 112 such as a patient. Thus, the detector array 108 can acquire projection data for each view.

The projection data detected by the detector array 108 is collected by the DAS 214. The DAS 214 performs prescribed processing, including sampling and digital conversion, on the collected projection data. The processed projection data is transmitted to a computer 216. The computer 216 stores the data from the DAS 214 in a storage device 218. The storage device 218 includes one or more storage media that store programs and instructions to be executed by the processor. The storage medium can be, for example, one or more non-transitory, computer-readable storage media. Storage devices 218 may include, for example, hard disk drives, floppy disk drives, compact disc read/write (CD-R/W) drives, digital versatile disk (DVD) drives, flash drives, and/or solid-state storage drives.

The computer 216 includes one or a plurality of processors. The computer 216 uses one or a plurality of processors to output commands and parameters to the DAS 214, X-ray controller 210, and/or gantry motor controller 212, to control system operations such as data acquisition and/or processing.

An operator console 220 is linked to the computer 216. An operator can enter prescribed operator inputs related to the operation of the CT system 100 into the computer 216 by operating the operator console 220. The computer 216 receives operator input, including commands and/or scan parameters, via the operator console 220 and controls system operation based on that operator input. The operator console 220 can include a keyboard (not shown) or touch screen for the operator to specify commands and/or scan parameters.

The X-ray controller 210 controls the X-ray tube 104 based on control signals from the computer 216. In the example embodiment, the X-ray controller 210 can control the X-ray tube 104 so that an X-ray beam is emitted from the X-ray tube 104 while switching the voltage applied to the cathode-anode tube of the X-ray tube 104 between a first voltage and second voltage at high speed. In addition, the gantry motor controller 212 controls the gantry motor based on control signals from the computer 216.

FIG. 2 illustrates only one operator console 220, but two or more operator consoles may be linked to the computer 216. In addition, the CT system 100 may also allow a plurality of remotely located displays, printers, workstations, and/or similar devices to be linked via, for example, wired and/or wireless networks. In one embodiment, for example, the CT system 100 may include or be linked to a Picture Archiving and Communication System (PACS) 224. In a typical implementation, a PACS 224 may be linked to a remote system such as a radiology department information system, hospital information system, and/or internal or external network (not shown).

The computer 216 supplies commands to the table motor controller 118 to control the table 116. The table motor controller 118 can control the table 116 based on commands received. In particular, the table motor controller 118 can move the table 116 so that the imaging subject 112 is properly positioned within the opening of the gantry 102.

As mentioned above, the DAS 214 samples and digitally converts the projection data acquired by the detector elements 202. The image reconstruction unit 230 then reconstructs the image using the sampled and digitally converted data. The image reconstruction unit 230 includes one or a plurality of processors, which can perform the image reconstruction process. In FIG. 2, the image reconstruction unit 230 is illustrated as a separate structural element from the computer 216, but the image reconstruction unit 230 may form a part of the computer 216. In addition, the computer 216 may also perform one or more functions of the image reconstruction unit 230. In addition, the image reconstruction unit 230 may be located away from the CT system 100 and operatively connected to the CT system 100 using a wired or wireless network. The computer 216 and image reconstruction unit 230 function as image generation devices.

The image reconstruction unit 230 can store the reconstructed image in the storage device 218. The image reconstruction unit 230 may also transmit the reconstructed image to the computer 216. The computer 216 can transmit the reconstructed image and/or patient information to a display 232 communicatively linked to the computer 216 and/or image reconstruction unit 230.

The various methods and processes described in the present specification can be stored as executable instructions on a non-transitory storage medium within the CT system 100. The executable instructions may be stored on a single storage medium or distributed across multiple storage mediums. One or more processors provided in the CT system 100 execute the various methods, steps, and processes described in the present specifications in accordance with instructions stored on a storage medium.

The CT system 100 is configured as described above. The CT system 100 can perform imaging using DECT technology. In the present embodiment, the CT system 100 is configured to be able to perform DECT imaging using the Rapid kV switching method. DECT is a technology that uses X-rays in different energy regions to discriminate materials and has a wide range of applications; for example, it can be used to reconstruct virtual monochromatic X-ray images at each energy. Virtual monochromatic X-ray images have the advantage of suppressing beam hardening artifacts and reducing metal artifacts. Therefore, more and more medical institutions are installing CT systems equipped with DECT technology every year.

However, some medical institutions have not installed DECT-compatible CT equipment. Therefore, to provide diagnosis using virtual monochromatic X-ray images even to medical institutions that do not have DECT-compatible CT devices, technologies to infer virtual monochromatic X-ray images from images acquired by SECT using deep learning have also been researched and developed.

In this manner, DECT technology is very useful in diagnosing patients. On the other hand, DECT technology also involves various challenges. For example, DECT technology can reconstruct virtual monochromatic X-ray images of different energies, but the principle of DECT results in increased noise when reconstructing lower energy virtual monochromatic X-ray images.

Therefore, the inventor of the present application put forth diligent study and came up with the idea of generating high quality virtual monochromatic X-ray images. The following describes the basic concept of obtaining high-quality virtual monochromatic X-ray images in the present Embodiment.

As explained above, technologies for inferring virtual monochromatic X-ray images using deep learning have been studied and developed to provide diagnoses using virtual monochromatic X-ray images even at medical institutions that have not installed DECT-compatible CT equipment. For example, a technique has been studied and developed in which a neural network is trained with data collected by DECT to create a trained neural network, and this trained neural network is used to infer virtual monochromatic X-ray images. In the process of studying techniques for inferring virtual monochromatic X-ray images using trained neural networks, the inventors of this application noticed a characteristic trend in the image quality of virtual monochromatic X-ray images.

Specifically, the inventors have found that virtual monochromatic X-ray images inferred by a trained neural network tend to inherit features of the image quality (for example, image texture and image noise) of the input image that is input to the trained neural network. In the present Embodiment, this knowledge is used to improve the image quality of virtual monochromatic X-ray images. The basic concept of the method for obtaining virtual monochromatic X-ray images with improved image quality is explained below with reference to FIG. 3.

Figure 3:
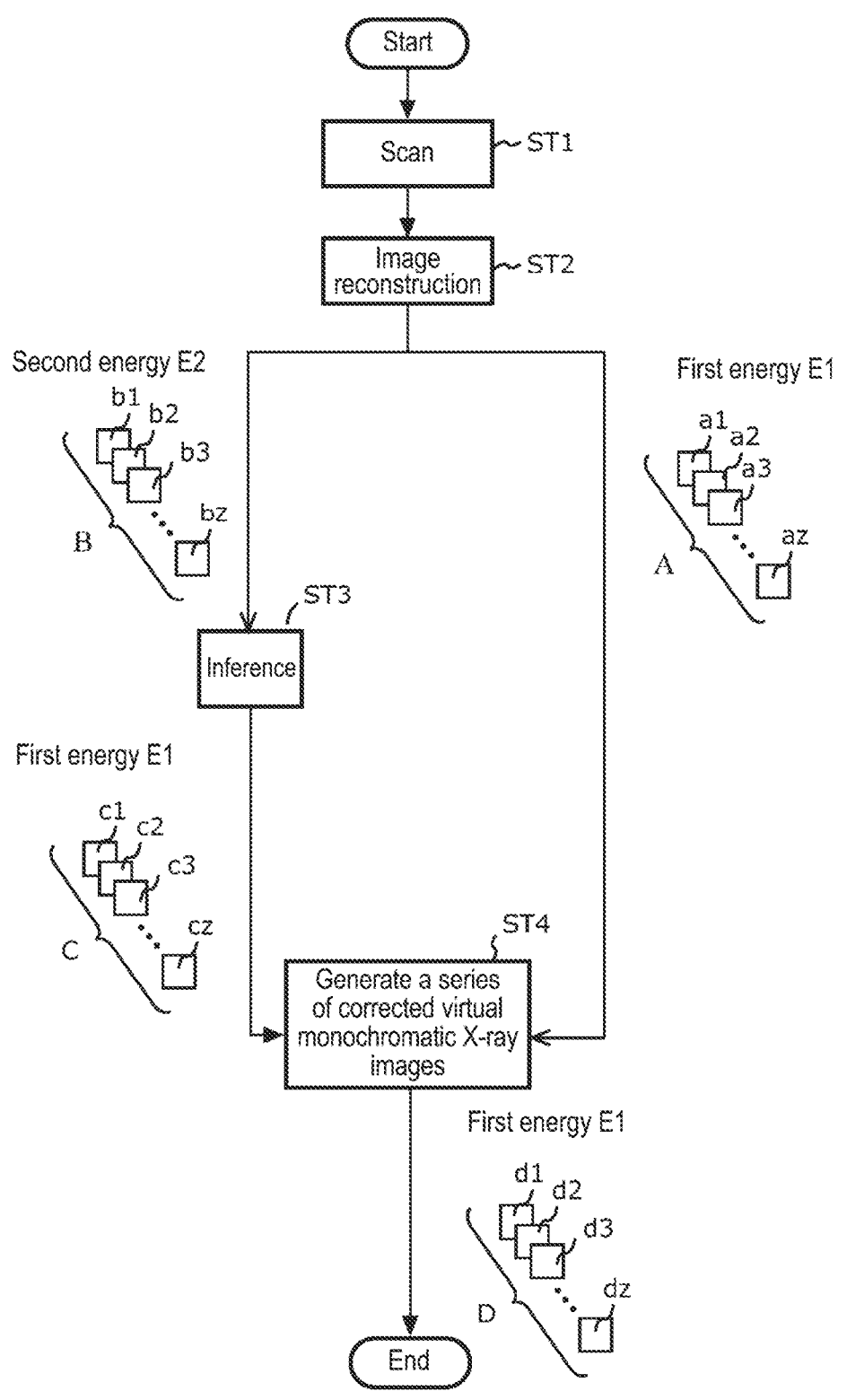
FIG. 3 is a flowchart for explaining the basic idea of a technique for acquiring a virtual monochromatic X-ray image with improved image quality.

FIG. 3 is a flowchart for explaining the basic idea of a technique for acquiring a virtual monochromatic X-ray image with improved image quality. In step ST1, the imaging subject is scanned using DECT technology. Scans using DECT technology, can be, for example, performed using the Rapid kV switching method.

In step ST2, virtual monochromatic X-ray images of multiple energy Ei (i=1 to n) are reconstructed based on the data acquired in step ST1. Here, as virtual monochromatic X-ray images of a plurality of energies Ei (i=1 to n), we consider reconstructing a series A of virtual monochromatic X-ray images a1 to az with i=1, or in other words the first energy E1, and a series B of virtual monochromatic X-ray images b1 to bz with the second energy E2. The first energy E1 is, for example, 50 (keV) and the second energy E2 is, for example, 70 (keV).

The series A of virtual monochromatic X-ray images a1 to az of the first energy E1 are low-energy virtual monochromatic X-ray images and tend to degrade in image quality due to the principle of DECT. On the other hand, among the virtual monochromatic X-ray images reconstructed by DECT technology with a plurality of energies Ei (i=1 to n), there are virtual monochromatic X-ray images of the second energy with less deterioration in image quality than a lower energy virtual monochromatic X-ray image such as 50 (keV). For example, it is known that a virtual monochromatic X-ray image with a second energy E2 of 70 (keV) has better image quality than a virtual monochromatic X-ray image with a first energy E1 of 50 (keV).

On the other hand, as mentioned above, the inventors have found that virtual monochromatic X-ray images inferred by a trained neural network tend to inherit features of the image quality (for example, image texture and image noise) of the input image that is input to the trained neural network. Therefore, using deep learning technology, when inferring the series C of virtual monochromatic X-ray images c1 to cz of the first energy E1 based on the series B of virtual monochromatic X-ray images b1 to bz of the second energy E2 (70 kev) with relatively low degradation of image quality, the inferred image series C is considered to inherit the image qualities of the image series B which has low degradation of image quality. Therefore, a region depicted with low image quality in the reconstructed series A of virtual monochromatic X-ray images a1 to az of the first energy E1 can be depicted as a region with improved image quality in the inferred series C of virtual monochromatic X-ray images c1 to cz of the first energy E1.

Therefore, the present Embodiment, in step ST3, uses deep learning technology to infer, based on the series B of virtual monochromatic X-ray images b1 to bz of the second energy E2 (70 keV), the virtual monochromatic X-ray images c1 to cz of the first energy E1 series C.

Next, in step ST4, based on the reconstructed series A of virtual monochromatic X-ray images a1 to az of the first energy E1 and the inferred series C of virtual monochromatic X-ray images c1 to cz of the first energy E1, a corrected series D of virtual monochromatic X-ray images d1 to dz of the first energy E1 is generated. Therefore, it is considered possible to obtain a series D of virtual monochromatic X-ray images d1 to dz of the first energy E1 with improved quality.

The inventor has considered acquiring a first energy virtual monochromatic X-ray image with improved quality in accordance with the above principle. The following describes the flow of acquiring a virtual monochromatic X-ray image of the first energy E1 with improved quality in accordance with the above principle.

Figure 4:
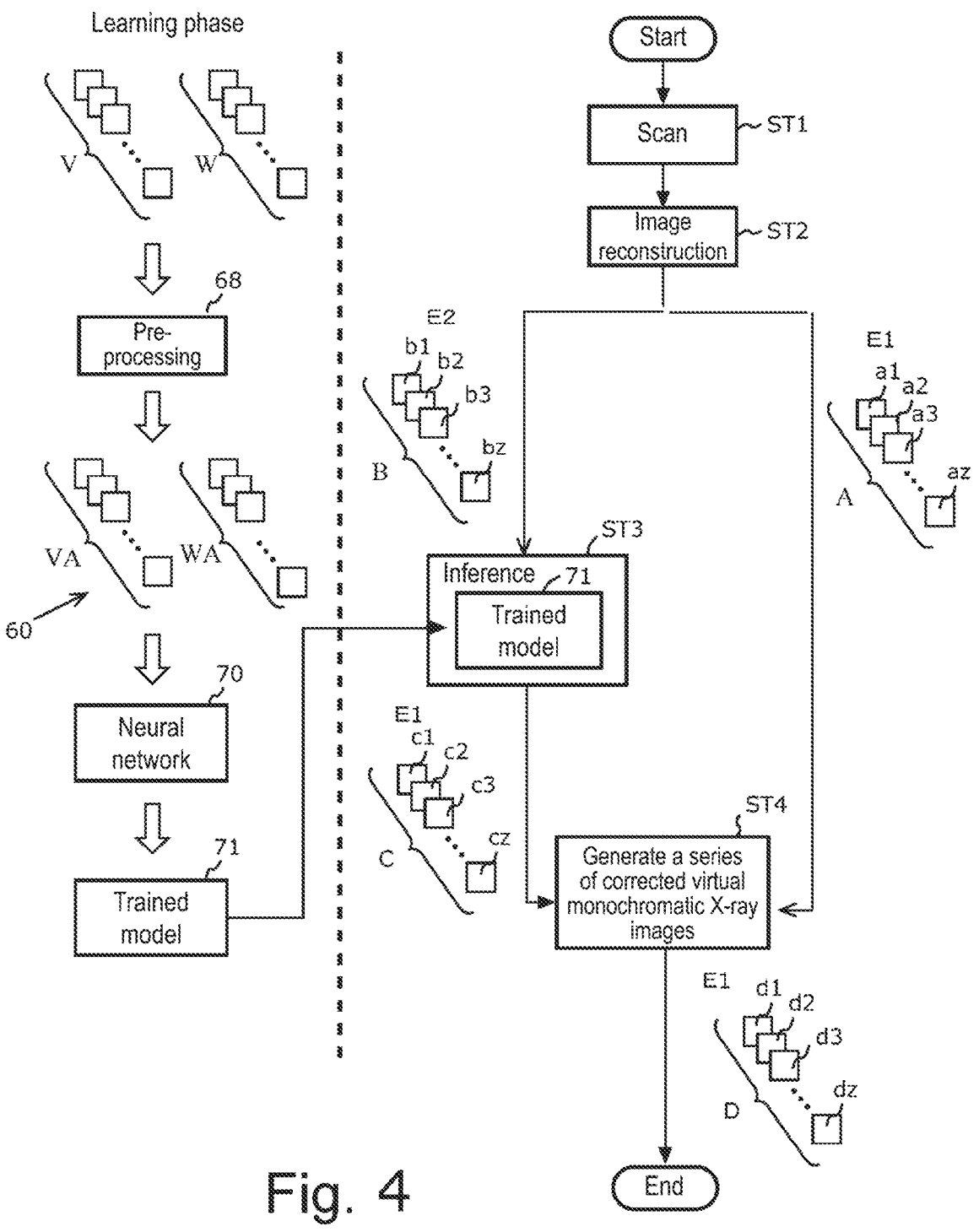
FIG. 4 is a diagram illustrating the flow of acquiring a first energy E1 virtual monochromatic X-ray image with improved quality.

FIG. 4 illustrates the flow of acquiring a virtual monochromatic X-ray image of the first energy E1 with improved quality. In addition, as explained with reference to FIG. 3, in the present embodiment, since the present embodiment infers the virtual monochromatic X-ray image of the first energy E1 from the virtual monochromatic X-ray image of the second energy E2, it is necessary to prepare in advance a trained model that can perform this inference. Therefore, first, a training phase for generating this trained model is described below. Furthermore, after describing the training phase, the flow of acquiring a high-quality first energy virtual monochromatic X-ray image according to the above principle is described.

In the training phase, first, original images are prepared which form a basis for generating training data. In the example embodiment, virtual monochromatic X-ray images of different energies Ei (i=1 to n) acquired by DECT are prepared as the original images.

In the present embodiment, we will consider two energies, the first energy E1 (i=1) and the second energy E2 (i=2), as the energy Ei of the virtual monochromatic X-ray image. The first energy E1 is 50 (keV) and the second energy E2 is 70 (keV). Therefore, a set of virtual monochromatic X-ray images V of the first energy E1 (=50 (keV)) and a set of virtual monochromatic X-ray images W of the second energy E2 (=70 (keV)) are prepared as the original images. Virtual monochromatic X-ray images of three or more energies E1 to En (n≥3) may also be prepared as the original images.

Next, pre-processing 68 is executed on these sets of virtual monochromatic X-ray images V and W, as illustrated in FIG. 4.

The pre-processing 68 includes, for example, image cropping, standardization, normalization, image inversion, image rotation, a magnification percentage change, and an image quality change. By pre-processing sets V and W of the original images, sets VA and WA of pre-processed virtual monochromatic X-ray images can be obtained. The preprocessed sets of virtual monochromatic X-ray images VA and WA are used as training data 60 to create the trained model.

Next, the training data 60 is used to train the neural network 70. The neural network 70 can use, for example, a convolutional neural network. In the present embodiment, the neural network 70 is trained to output a virtual monochromatic X-ray image with an energy of 50 (keV) based on a virtual monochromatic X-ray image with an energy of 70 (keV), and a trained model 71 is created.

After the trained model 71 is created, an evaluation of the trained model 71 is performed. The evaluation may, for example, use a confusion matrix. Accuracy, for example, may be used as an indicator index for the evaluation.

If the evaluation is favorable, the trained model 71 described above is used as the model for executing the inference (step ST3) described below. If the evaluation is poor, the training phase is performed again, for example, by adding more training data. This trained model 71 is stored in the storage device 218 of the CT system 100. The trained model 71 may be stored on an external storage device accessible by the CT system 100.

In the present embodiment, the trained model 71 is used to generate high-quality virtual monochromatic X-ray images. The flow for generating high-quality virtual monochromatic X-ray images using the trained model 71 is described below, with reference to the flow on the right side of FIG. 4. In step ST1, the imaging subject is scanned using DECT technology. Scans using DECT technology, can be, for example, performed using the Rapid kV switching method.

In step ST2, virtual monochromatic X-ray images of multiple energy Ei (i=1 to n) are reconstructed based on the data acquired in step ST1. The data obtained from the scan is collected by the DAS 214 (see FIG. 2), and the collected data is transmitted to the computer 216 or image reconstruction unit 230. On the computer 216 or image reconstruction unit 230, the processor reconstructs virtual monochromatic X-ray images of different energies based on the data obtained from the scan. In Embodiment 1, a series A of virtual monochromatic X-ray images a1 to az of the first energy E1 and a series B of virtual monochromatic X-ray images b1 to bz of the second energy E2 are reconstructed. Here, the first energy E1 is 50 (keV) and the second energy E2 is 70 (keV), but other energy values may be used. After reconstructing these virtual monochromatic X-ray image series A and B, the process proceeds to step ST3.

In step ST3, the computer 216 performs an inference phase to infer a series C of virtual monochromatic X-ray images c1 to cz of the first energy E1 (=50 keV) based on a series B of virtual monochromatic X-ray images b1 to bz of the second energy E2 (=70 keV). In the inference phase, the computer 216 pre-processes each virtual monochromatic X-ray image b1 to bz of the second energy E2 (=70 keV) to generate input images that are input to the trained model 71.

Next, the computer 216 inputs the input images to the trained model 71 and uses the trained model 71 to infer a series C of virtual monochromatic X-ray images c1 to cz of the first energy E1 (=50 keV). After inferring the image series C, the process proceeds to step ST4.

In step ST4, the computer 216 generates a corrected series D of virtual monochromatic X-ray images d1 to dz of the first energy E1 (=50 keV) based on the reconstructed series A of virtual monochromatic X-ray images a1 to az of the first energy E1 (=50 kev) and the inferred series C virtual monochromatic X-ray images c1 to cz of the first energy E1 (=50 keV).

Figure 5:
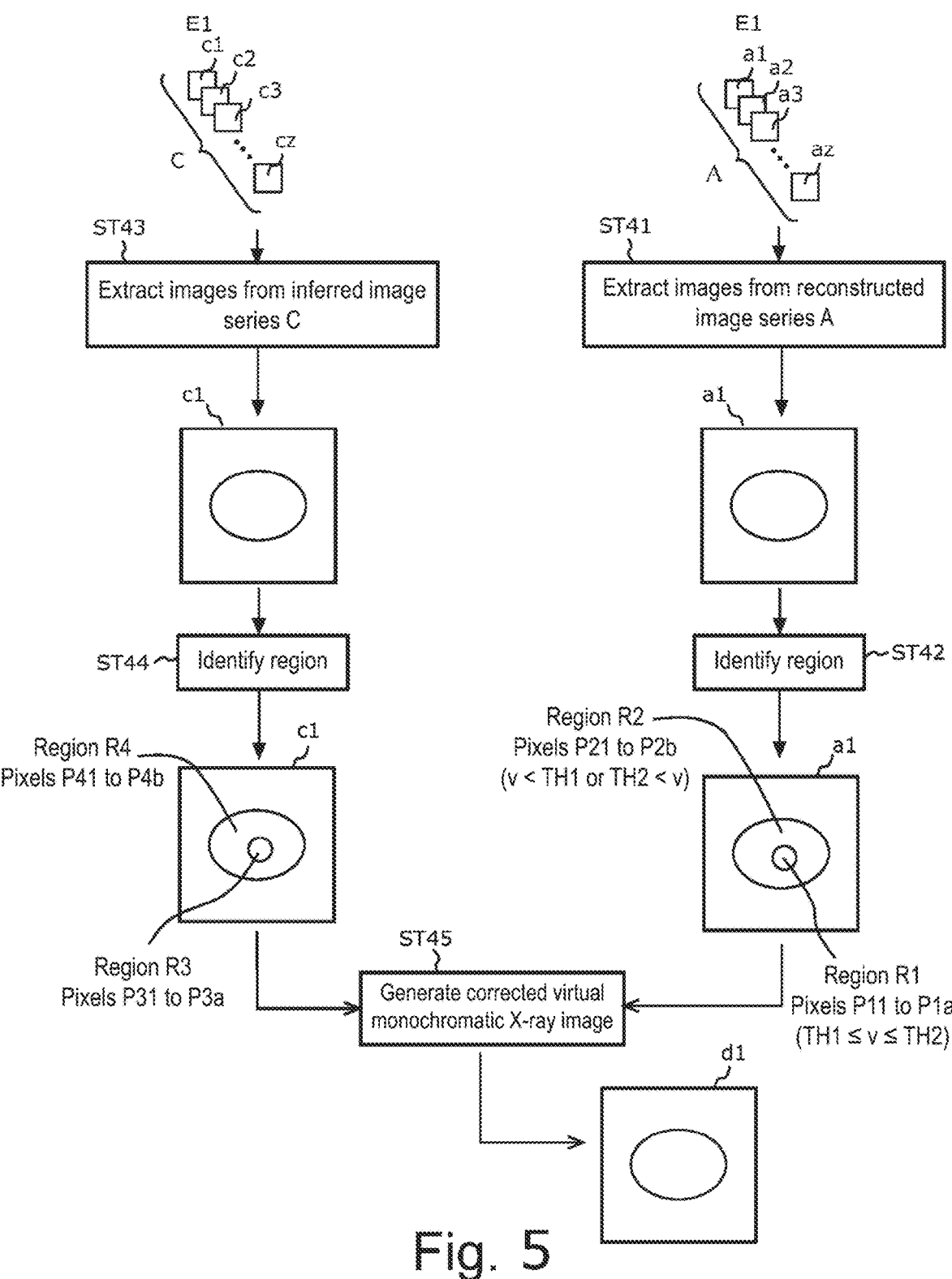
FIG. 5 is an explanatory diagram of a method of generating a corrected series D of virtual monochromatic X-ray images d1 to dz of the first energy E1 (=50 keV) in step ST4.

This generation method is explained below with reference to FIG. 5. FIG. 5 is an explanatory diagram of a method of generating a corrected series D of virtual monochromatic X-ray images d1 to dz of the first energy E1 (=50 keV) in step ST4. In step ST41, the computer 216 extracts a single virtual monochromatic X-ray image aj from the reconstructed series A of virtual monochromatic X-ray images a1 to az of the first energy E1 (=50 kev). Here, assume that j=1, or in other words, the computer retrieves the virtual monochromatic X-ray image a1. After retrieving the virtual monochromatic X-ray image a1, processing proceeds to step ST42. In step ST42, the computer 216 identifies likely soft tissue areas in the virtual monochromatic X-ray image a1.

Figure 6:
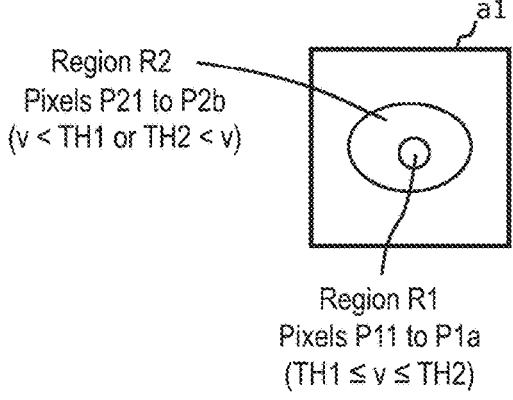
FIG. 6 is an explanatory diagram of a method of specifying a region with a high possibility of being soft tissue in step ST42.
Figure 6:
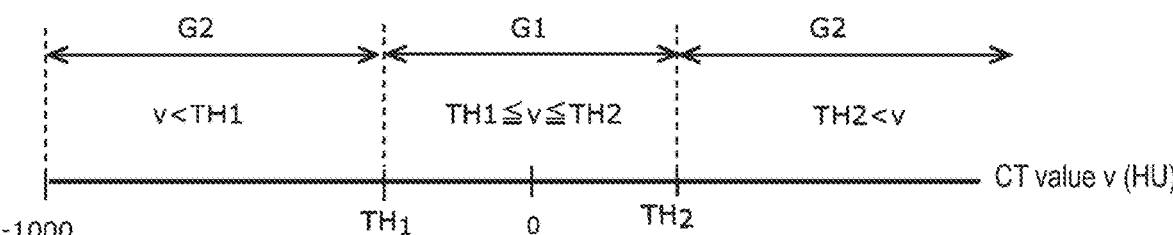

FIG. 6 is an explanatory diagram of the method for identifying tissue areas that are likely to be soft in step ST42. FIG. 6 illustrates two threshold values, TH1 and TH2, which are the criteria for determining whether a pixel CT value is a soft tissue CT value. The threshold value TH1 represents the lower limit of CT values for soft tissue, and the threshold value TH2 represents the upper limit of CT values for soft tissue. Therefore, the range G1 of $TH1 \le v \le TH2$ represents the range where soft tissue CT values are likely to be included, and the range G2 of $v < TH1$ or $TH2 < v$ represents the range where soft tissue CT values are less likely to be included. Soft tissue CT values are generally included within the range of –150 (HU) to 150 (HU). Thus, TH1 and TH2 can be determined, for example, TH1=–150 (HU) and TH2=150 (HU).

The computer 216 compares the CT value v of each pixel of the virtual monochromatic X-ray image a1 with the threshold values TH1 and TH2 to determine, for each pixel, whether the CT value v is included in the range G1 of TH1≤v≤TH2 or the range G2 of v<TH1 or TH2<v.

For the sake of explanation, let us assume that the CT value v of pixels P11 to P1a in region R1 of the virtual monochromatic X-ray image a1 is TH1≤v≤TH2 and the CT value v of pixels P21 to P2b in region R2 is v<TH1 or TH2<v.

Therefore, the computer 216 identifies the region R1 including pixels P11 to Pla with CT value v in the range G1 of TH1≤v≤TH2 from the virtual monochromatic X-ray image a1 as the first region with a high possibility of soft tissue. On the other hand, the computer 216 identifies the region R2 including pixels P21 to P2b with CT values in the range G2 with v<TH1 or TH2<v from the virtual mono-chromatic X-ray image a1 as the second region with a low possibility of soft tissue.

Therefore, by executing the process of step ST42, pixels P11 to P1a that are more likely to belong to soft tissue and pixels P21 to P2b that are less likely to belong to soft tissue can be identified in the virtual monochromatic X-ray image a1.

Next, in step ST43, the computer 216 retrieves the virtual monochromatic X-ray image c1 from the inferred series C virtual monochromatic X-ray images c1 to cz of the first energy E1 (=50 keV), corresponding to the same cross-sectional image as the virtual monochromatic X-ray image a1. After retrieving the virtual monochromatic X-ray image c 1, processing proceeds to step ST44.

In step ST44, the computer 216 identifies areas that are likely soft tissue in the virtual monochromatic X-ray image c1. Specifically, the computer 216 identifies, from the virtual monochromatic X-ray image c1, the region R3 correspond-ing to the region R1 of the virtual monochromatic X-ray image a1 identified in step ST42 as the third region having a high possibility of being soft tissue. Furthermore, the computer 216 identifies, from the virtual monochromatic X-ray image c1, the region R4 corresponding to the region R2 in the virtual monochromatic X-ray image a1 identified in step ST42 as a fourth region having a low likelihood of being soft tissue.

Therefore, by executing the process of step ST44, pixels P31 to P3a that are more likely to belong to soft tissue and pixels P41 to P4b that are less likely to belong to soft tissue can be identified in the virtual monochromatic X-ray image c1.

The computer 216 then proceeds to step ST45. In step ST45, a corrected virtual monochromatic X-ray image of the first energy d1 is generated based on the reconstructed first energy E1 (=50 keV) virtual monochromatic X-ray image a1 and the inferred first energy E1 (=50 keV) virtual mono-chromatic X-ray image c1. An example of the flow of step ST45 is described below.

Figure 7:
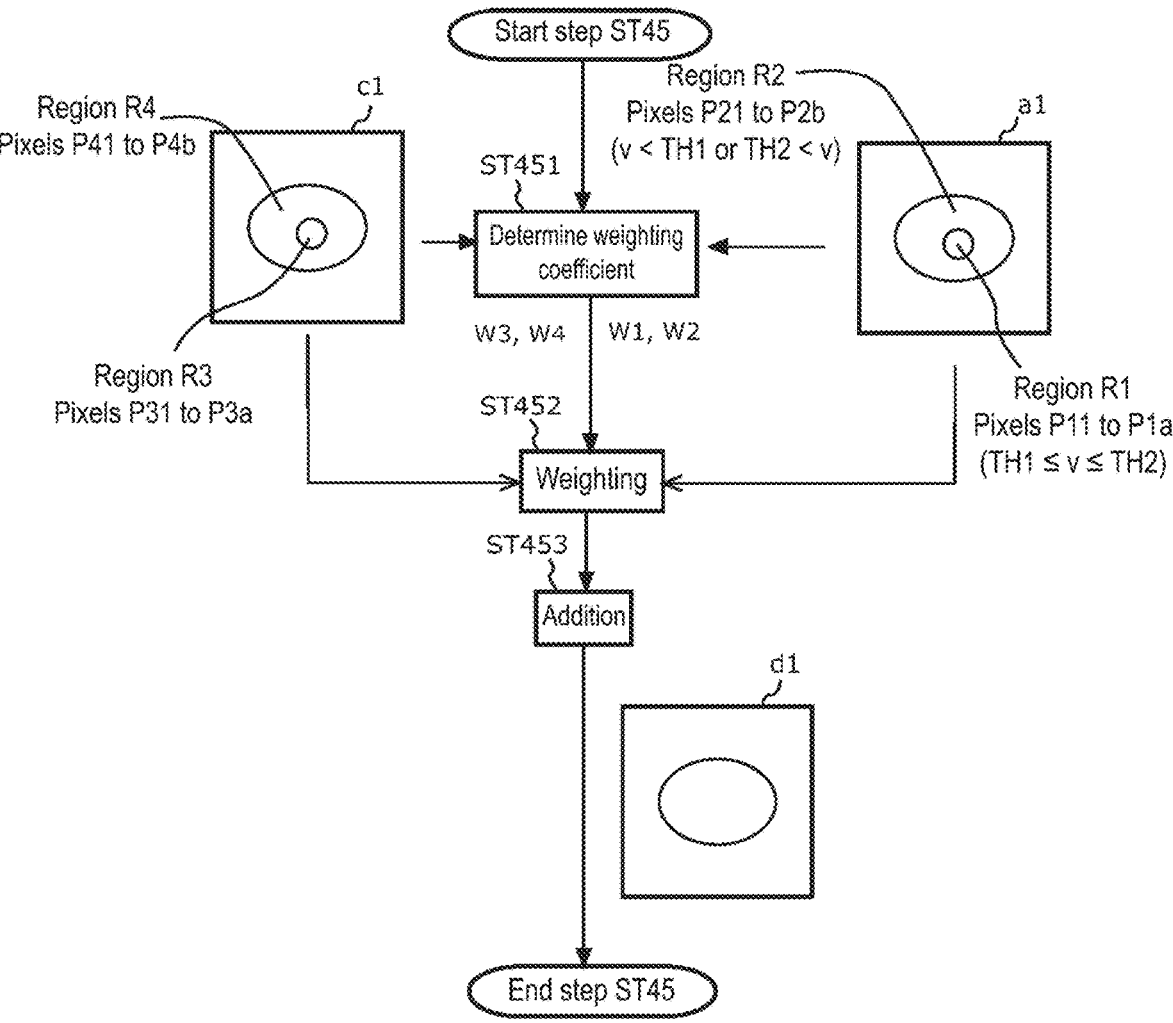
FIG. 7 is a diagram illustrating an example of step ST45.

FIG. 7 illustrates an example of step ST45. Step ST45 includes steps ST451, ST452, and ST453. Each step is described in turn below. In step ST451, the weighting coefficients of the CT value v of each pixel in the virtual monochromatic X-ray images a1 and c1 is determined.

Figure 8:
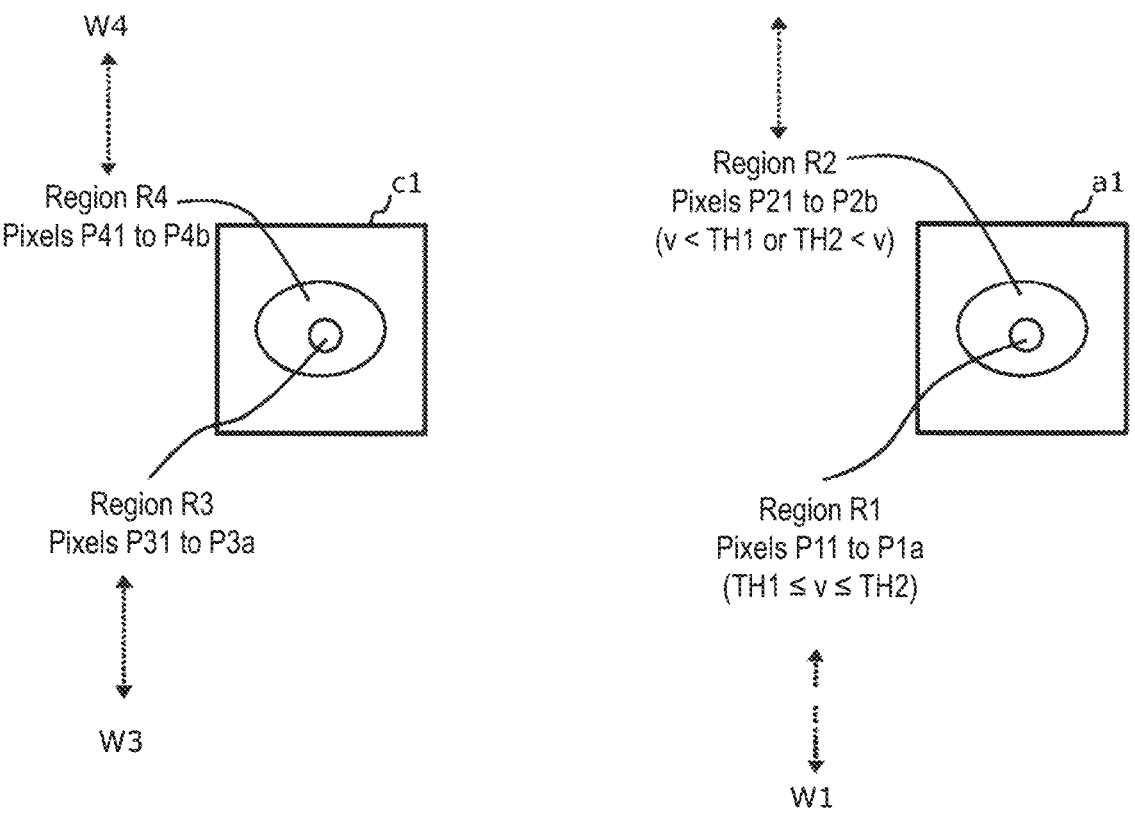
FIG. 8 is an explanatory diagram of a method of determining weighting coefficients.

FIG. 8 is an explanatory diagram of how the weighting coefficients are determined. First, the weighting coefficient W1 of the CT value v of each pixel in region R1 of the reconstructed first energy E1 (=50 keV) virtual monochromatic X-ray image a1 and the weighting coefficient W3 of the CT value v of each pixel in region R3 of the inferred first energy E1 (=50 keV) virtual monochromatic X-ray image c1 are explained.

Pixels P11 to P1a in the region R1 of the reconstructed virtual monochromatic X-ray image a1 of the first energy E1 (=50 keV) are likely to correspond to soft tissue pixels since the CT value v is contained in TH1≤v≤TH2. In the low-energy virtual monochromatic X-ray image a1, the image quality of soft tissue tends to deteriorate easily, so region R1 is likely to be depicted with low image quality.

On the other hand, the inferred virtual monochromatic X-ray image c1 of the first energy E1 (=50 keV) inherits the favorable image quality of the virtual monochromatic X-ray image b1 (see FIG. 4) of the second energy E2 (=70 keV). Therefore, the image quality of region R3 of the inferred virtual monochromatic X-ray image c1 of the first energy E1 (=50 keV) is considered to be better than the image quality of region R1 of the reconstructed virtual monochromatic X-ray image a1 of the first energy E1 (=50 keV).

Therefore, to improve the image quality of soft tissue regions, pixels P11 to P1a in the region R1 of the recon-structed virtual monochromatic X-ray image a1 of the first energy E1 (=50 keV) are assigned a weighting coefficient W1 to lower the weighting of the CT values, considering that they are more likely to have low image quality. On the other hand, considering that pixels P31 to P3a in region R3 of the inferred virtual monochromatic X-ray image c1 of the first energy E1 (=50 keV) are better than the image quality of region R1 of the virtual monochromatic X-ray image a1, a weighting coefficient W3 is assigned to increase the weight-ing of the CT values.

Therefore, the weighting coefficient W3 for pixels P31 to P3a in region R3 of the inferred virtual monochromatic X-ray image c1 is assigned a value greater than the weight-ing coefficient W1 for pixels P11 to P1a in region R1 of the reconstructed virtual monochromatic X-ray image a1. Spe-cifically, the values of W1 and W3 are set so that W3>W1 under the condition that W1+W3=1. For example, W1=0.3 and W3=0.7. In Embodiment 1, W1+W3=1, but the value of W1+W3 can be set to a value deviating from "1".

Next, the weighting coefficient W2 of the CT value v of each pixel in region R2 of the reconstructed first energy E1 (=50 keV) virtual monochromatic X-ray image a1 and the weighting coefficient W4 of the CT value v of each pixel in region R4 of the inferred first energy E1 (=50 keV) virtual monochromatic X-ray image c1 are explained.

Since the CT value v of region R2 in the virtual mono-chromatic X-ray image a1 is included in the range of v<TH1 or TH2<v, air, gas, bone, and the like are considered to be depicted in region R2. Since region R4 of the virtual monochromatic X-ray image c1 corresponds to region R2 of the virtual monochromatic X-ray image a1, air, gas, and bone, and the like are also considered to be depicted in region R4 of the virtual monochromatic X-ray image c1. In general, in regions such as air, gas, bone, and the like where the CT value v is far from the CT value of water (zero), the reconstructed virtual monochromatic X-ray image a1 of the first energy E1 (=50 keV) can be considered more reliable than the virtual monochromatic X-ray image c1 of the first energy E1 (=50 keV) inferred by deep learning technology. Therefore, the pixels P21 to P2b in region R2 of the reconstructed virtual monochromatic X-ray image a1 are assigned a weighting coefficient W2 for a higher weighting of CT values, while pixels P41 to P4b in region R4 of the inferred virtual monochromatic X-ray image c1 are assigned a weighting coefficient W4. For example, W2=0.7 and W4=0.3. Note that in a first example embodiment, W2+W4=1, but the value of W2+W4 can be set to a value deviating from "1". In this manner, the weighting coefficients W1, W2, W3, and W4 are determined. After determining the weighting coefficients, proceed to step ST452 (see FIG. 7).

In step ST452, the computer 216 weights the CT values v of the reconstructed virtual monochromatic X-ray image a1 of the first energy E1 (=50 keV) with weighting coefficients W1 and W2, and the CT values v of the inferred virtual monochromatic X-ray image c1 of the first energy E1 (=50 keV) with weighting coefficients W3 and W4. Furthermore, processing proceeds to step ST453 and the computer 216 adds together the weighted virtual monochromatic X-ray images a1 and b1. In this manner, a corrected virtual monochromatic X-ray image d1 of the first energy E1 (=50 keV) can be generated.

In the same manner, the weighting coefficients are obtained for other virtual monochromatic X-ray images a2 to az and c2 to cz, and corrected virtual monochromatic X-ray images are generated based on the weighting coefficients. Thus, as illustrated in FIG. 4, a series D of virtual monochromatic X-ray images d1 to dz of the first energy E1 with improved quality can be generated. Thus, the flow shown in FIG. 4 is completed.

In an example embodiment, in step ST2, a series A of virtual monochromatic X-ray images a1 to az of the first energy E1 and a series B of virtual monochromatic X-ray images b1 to bz of the second energy E2 are reconstructed using DECT technology. However, low quality regions R1 (see FIG. 5) tend to appear in the low-energy series A virtual monochromatic X-ray images a1 to az, due to the principles of DECT.

Therefore, in the example embodiment, the fact that the virtual monochromatic X-ray image inferred by the trained neural network tends to inherit the characteristics of the image quality (for example, image texture, image noise) of the input image that is input to the trained neural network is utilized to infer the virtual monochromatic X-ray image. Specifically, in step ST3 (see FIG. 4), the virtual monochromatic X-ray images c1 to cz of the first energy E1 series C are inferred based on the series B of virtual monochromatic X-ray images b1 to bz of the second energy E2 (70 keV), which have relatively little degradation of image quality. The inferred series C of virtual monochromatic X-ray images c1 to cz of the first energy E1 inherits the image quality of the series B of virtual monochromatic X-ray images b1 to bz of the second energy E2 (70 keV). As a result, the region R3 (see FIG. 8) in the inferred series C of virtual monochromatic X-ray images c1 to cz of the first energy E1 can have better image quality than the region R1 (see FIG. 8) of the reconstructed virtual monochromatic X-ray images a1 to az of the first energy E1.

After inference, in step ST4, based on the reconstructed series A of virtual monochromatic X-ray images a1 to az of the first energy E1 and the inferred series C of virtual monochromatic X-ray images c1 to cz of the first energy E1, a corrected series D of virtual monochromatic X-ray images d1 to dz of the first energy E1 is generated. Specifically, weighting coefficients W1 and W2 are assigned to the reconstructed series A of virtual monochromatic X-ray images a1 to az of the first energy E1 so that the CT values in region R1 are weighted less and the CT values in region R2 are weighted more. On the other hand, the weighting coefficients W3 and W4 are assigned to the inferred series C of virtual monochromatic X-ray images c1 to cz of the first energy E1 so that the CT values in region R3 are weighted more and the CT values in region R4 are weighted less. Thus, a series D of virtual monochromatic X-ray images d1 to dz of the first energy E1 with improved quality can be obtained.

In the example embodiment, in step ST42, in the virtual monochromatic X-ray image a1, region R1 is identified as the region with a high likelihood of being soft tissue and region R2 is identified as the region with a low likelihood of being soft tissue. Furthermore, after performing step ST42, processing proceeds to ST44 to identify the region R3 with high likelihood of being soft tissue and the region R4 with low likelihood of being soft tissue in the virtual monochromatic X-ray image c1. However, step ST44 may be executed first, and step ST42 may be executed after step ST44 is executed. In this case, steps ST44 and ST42 are performed as follows.

In step ST44, the CT value v of each pixel of the virtual monochromatic X-ray image c1 is compared with the two threshold values TH1 and TH2 to determine whether the CT value v falls within the range G1 of TH1≤v≤TH2 or the range G2 of v<TH1 or TH2<v. Furthermore, based on the results of this judgment, the region R3 with a high possibility of being soft tissue, and region R4 with a low possibility of being soft tissue are identified for the virtual monochromatic X-ray image c1.

In step ST42, from the virtual monochromatic X-ray image a1, the region R1 corresponding to the region R3 in the virtual monochromatic X-ray image c1 is identified as a region that is likely soft tissue. Furthermore, from the virtual monochromatic X-ray image a1, the region R2 corresponding to the region R4 in the virtual monochromatic X-ray image c1 is identified as a region less likely to be soft tissue.

Thus, regions R3 and R4 of the virtual monochromatic X-ray image c1 may be identified first, and regions R1 and R2 of virtual monochromatic X-ray image a1 may be identified based on regions R3 and R4 of virtual monochromatic X-ray image c1.

In the example embodiment, the virtual monochromatic X-ray image of the first energy E1 is inferred based on the virtual monochromatic X-ray image of the second energy E2, which is greater than the first energy E1. However, if it is possible to infer a virtual monochromatic X-ray image of the first energy E1 with good image quality, it is also possible to infer a virtual monochromatic X-ray image of the first energy E1 based on a virtual monochromatic X-ray image of the second energy E2 that is smaller than the first energy E1.

In the example embodiment, the weighting coefficients W1 to W4 are determined based on the threshold values TH1 and TH2. However, the weighting coefficients W1 to W4 may be determined in another way. For example, the virtual monochromatic X-ray images a1 and/or b1 may be filtered (low-pass filtered or high-pass filtered) and the weighting coefficients W1 to W4 may be determined based on the filtered virtual monochromatic X-ray image.

Another example embodiment describes an example of generating a corrected virtual monochromatic X-ray image in a different manner than in the first example embodiment. In the second example embodiment, a corrected virtual monochromatic X-ray image is generated by the same procedure as in Embodiment 1, except for step ST45. Therefore, for the second example embodiment, the description is primarily of step ST45.

Figure 9:
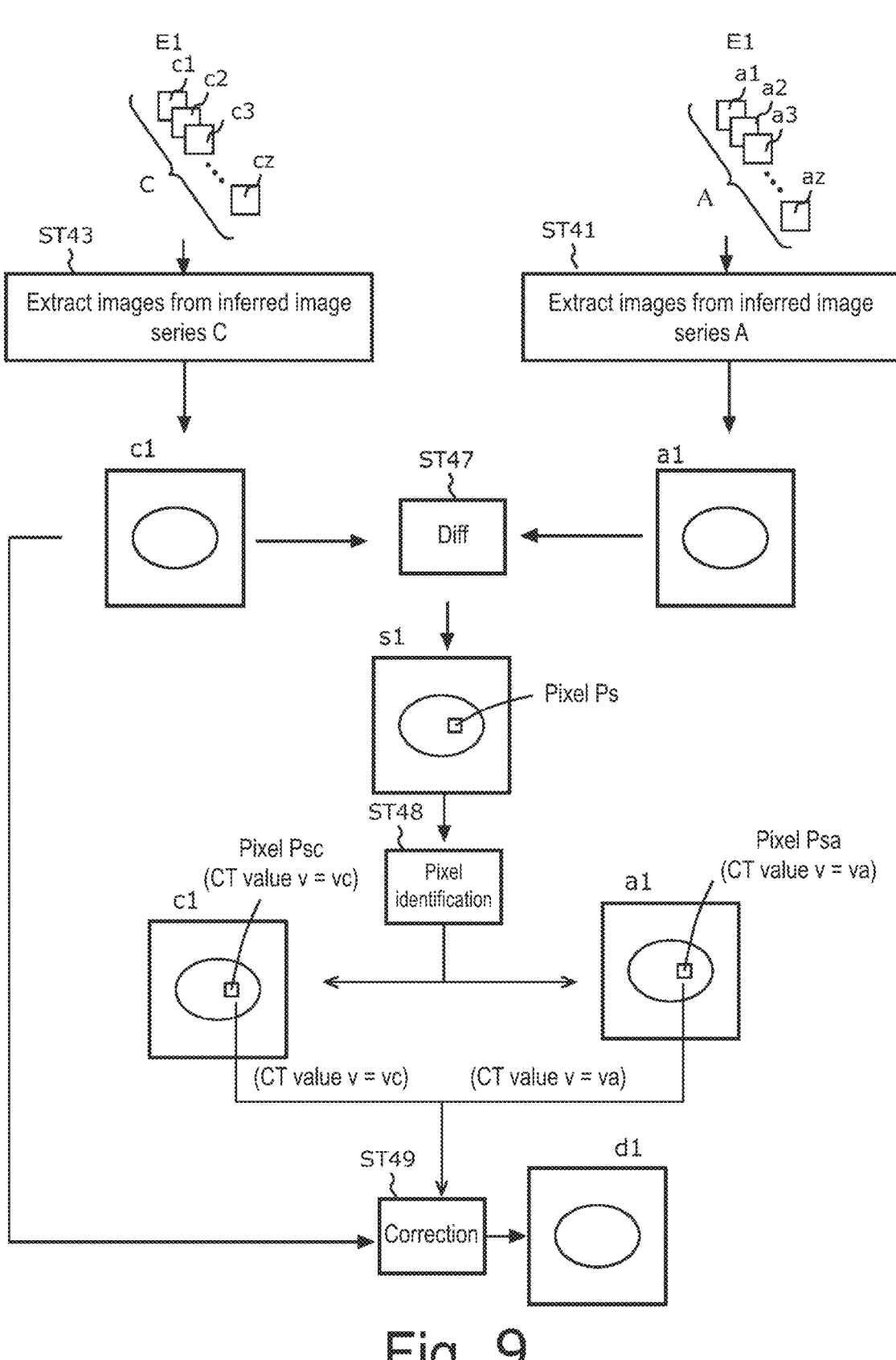
FIG. 9 is a flowchart of step ST45 in another example embodiment.

FIG. 9 is a flowchart of step ST45 in the second example embodiment. In step ST41, the computer 216 extracts a single virtual monochromatic X-ray image aj from the reconstructed series A of virtual monochromatic X-ray images a1 to az of the first energy E1 (=50 kev). Here, assume that j=1, or in other words, the computer retrieves the virtual monochromatic X-ray image a1.

In step ST43, the computer 216 retrieves the virtual monochromatic X-ray image c1 from the inferred series C virtual monochromatic X-ray images c1 to cz of the first energy E1 (=50 keV), which corresponds to the same cross section of the virtual monochromatic X-ray image a1. After retrieving the virtual monochromatic X-ray image c1, processing proceeds to step ST47.

In step ST47, the computer 216 determines a difference image s1 between the virtual monochromatic X-ray images a1 and c1. Next, the computer 216 identifies the pixel Ps that has the largest pixel value (difference value) among the plurality of pixels included in the difference image s1.

In step ST48, the computer 216 identifies the pixel Psa corresponding to pixel Ps among the plurality of pixels in the reconstructed virtual monochromatic X-ray image a1. The CT value v (=va) of the identified pixel Psa is then read out.

The computer 216 also identifies the pixel Psc corresponding to pixel Ps among the plurality of pixels in the inferred virtual monochromatic X-ray image c1. The CT value v (=vc) of the identified pixel Psc is then read out.

Next, in step ST49, the computer 216 corrects the inferred virtual monochromatic X-ray image c1 based on the CT value v (=va) of pixel Psa and CT value v (=vc) of pixel Psc. For example, gamma correction can be used as a correction method. The gamma used for gamma correction can be obtained from the CT value va of pixel Psa and the CT value vc of pixel Psc. In this manner, a corrected virtual monochromatic X-ray image d1 can be generated.

In the same manner, difference images are generated for other virtual monochromatic X-ray images a2 to az and c2 to cz, and corrected virtual monochromatic X-ray images are generated based on the difference images. Thus, a series D (see FIG. 4) of virtual monochromatic X-ray images d1 to dz of the first energy with improved quality can be generated.

In the second example embodiment, a corrected virtual monochromatic X-ray image d1 is generated by determining the difference image s1 and correcting the CT value of each pixel of the inferred virtual monochromatic X-ray image c1 based on the difference image s1. Therefore, the inferred virtual monochromatic X-ray image can be corrected by considering the difference in CT values between the inferred virtual monochromatic X-ray image c1 and the reconstructed virtual monochromatic X-ray image a1.

In the second example embodiment, the corrected virtual monochromatic X-ray image is generated based on the difference image s1. However, a corrected virtual monochromatic X-ray image d1 may also be generated based on frequency components by retrieving the low-frequency component of the inferred virtual monochromatic X-ray image c1 and the high-frequency component of the reconstructed virtual monochromatic X-ray image a1.

The following is a comparison of the virtual monochromatic X-ray image reconstructed by DECT and the virtual monochromatic X-ray image generated by the method of the present invention.

Figure 10:
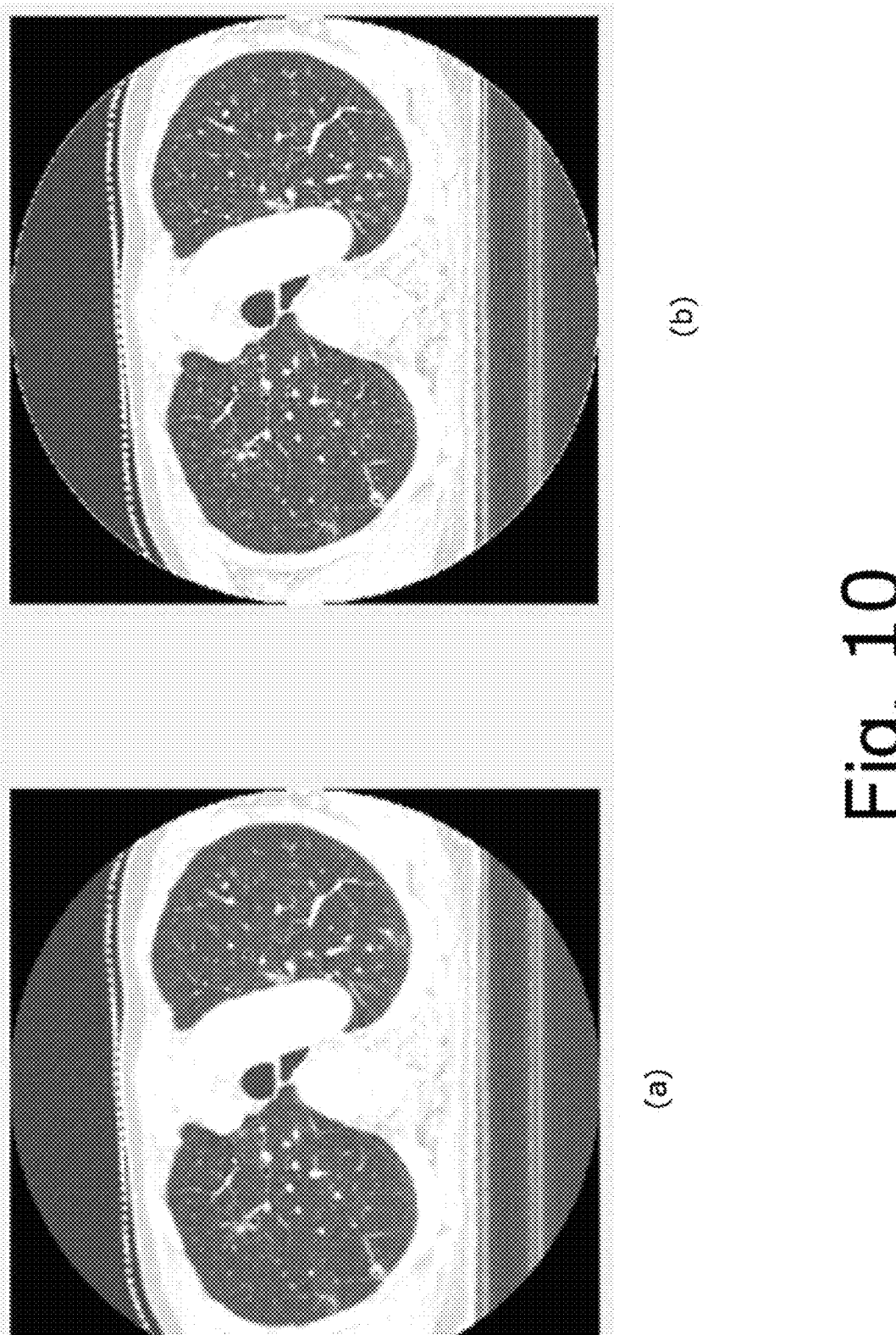
FIG. 10 is a diagram illustrating the virtual monochromatic X-ray image reconstructed by DECT and a virtual monochromatic X-ray image generated by means of the present invention.

FIG. 10 is a diagram illustrating the virtual monochromatic X-ray image reconstructed by DECT and a virtual monochromatic X-ray image generated by means of the present invention.

FIG. 10(a) illustrates a 50 (keV) virtual monochromatic X-ray image reconstructed using DECT, and FIG. 10(b) illustrates a virtual monochromatic X-ray image generated by means of the present invention. A comparison of both images illustrates that the image quality of the virtual monochromatic X-ray image generated by means of the present invention is improved.

What is claimed is:

1. An image generation device including one or a plurality of processors that perform operations comprising:
    reconstructing a virtual monochromatic X-ray image of a first energy and a virtual monochromatic X-ray image of a second energy based on data collected from an imaging subject;
    inputting an input image created based on the reconstructed virtual monochromatic X-ray image of the second energy into a trained model;
    inferring the virtual monochromatic X-ray image of the first energy using the trained model; and
    generating a corrected virtual monochromatic X-ray image of the first energy based on the reconstructed virtual monochromatic X-ray image of the first energy and the inferred virtual monochromatic X-ray image of the first energy, wherein generating the corrected virtual monochromatic X-ray image of the first energy includes:
        weighting CT values of each pixel of the reconstructed virtual monochromatic X-ray image of the first energy;
        weighting the CT values of each pixel of the inferred virtual monochromatic X-ray image of the first energy; and
        generating a corrected virtual monochromatic X-ray image of the first energy based on the weighted reconstructed virtual monochromatic X-ray image of the first energy and weighted inferred virtual monochromatic X-ray image of the first energy; and
    identifying, from a virtual monochromatic X-ray image of a first of the reconstructed virtual monochromatic X-ray image and inferred virtual monochromatic X-ray image, a first region including pixels with CT values in a first range and a second region including pixels with CT values in a second range;
    identifying, from a virtual monochromatic X-ray image of a second of the reconstructed virtual monochromatic X-ray image and inferred virtual monochromatic X-ray image, a third region corresponding to the first region and a fourth region corresponding to the second region;
    determining a first weighting coefficient for weighting the CT values of the pixels in the first region, a second weighting coefficient for weighting the CT values of the pixels in the second region, a third weighting coefficient for weighting the CT values of the pixels in the third region, and a fourth weighting coefficient for weighting the CT values of the pixels in the fourth region;
    weighting a first virtual monochromatic X-ray image with the first weighting coefficient and second weighting coefficient;
    weighting a second virtual monochromatic X-ray image with the third weighting coefficient and fourth weighting coefficient; and
    generating a corrected virtual monochromatic X-ray image of the first energy based on the first virtual monochromatic X-ray image weighted by the first weighting coefficient and second weighting coefficient and the second virtual monochromatic X-ray image weighted by the third weighting coefficient and fourth weighting coefficient.

2. The image generation device according to claim 1, wherein the first virtual monochromatic X-ray image is the reconstructed virtual monochromatic X-ray image and the second virtual monochromatic X-ray image is the inferred virtual monochromatic X-ray image.

3. The image generation device according to claim 1, wherein the first range represents the range of CT values of soft tissue.

4. The image generation device according to claim 3, wherein the first range is a range between a first threshold representing a lower limit of the CT values of soft tissue and a second threshold representing an upper limit of CT values of soft tissue.

5. The image generation device according to claim 4, wherein the first threshold is a negative value and the second threshold is a positive value.

6. The image generation device according to claim 1, wherein the one or a plurality of processors perform operations including:

filtering the reconstructed virtual monochromatic X-ray image of the first energy and/or the inferred virtual monochromatic X-ray image of the first energy; and determining a first weighting coefficient and a second weighting coefficient for weighting the CT values of pixels in the reconstructed virtual monochromatic X-ray image of the first energy, and determining a third weighting coefficient and a fourth weighting coefficient for weighting the CT values of pixels in the inferred virtual monochromatic X-ray image of the first energy, based on the filtered virtual monochromatic X-ray image.

7. The image generation device according to claim 1, wherein generating the corrected virtual monochromatic X-ray image of the first energy includes:

generating a difference image between the reconstructed virtual monochromatic X-ray image of the first energy and the inferred virtual monochromatic X-ray image of the first energy; and generating a corrected virtual monochromatic X-ray image of the first energy based on the difference image.

8. The image generation device according to claim 7, wherein generating the corrected virtual monochromatic X-ray image of the first energy based on the difference image includes:

identifying a pixel with the largest difference value from among a plurality of pixels in the difference image;

identifying a first pixel corresponding to the identified pixel among the plurality of pixels in the reconstructed virtual monochromatic X-ray image of the first energy;

identifying a second pixel corresponding to the identified pixel among the plurality of pixels in the inferred virtual monochromatic X-ray image of the first energy; and correcting the inferred virtual monochromatic X-ray image of the first energy based on CT values of the first pixel and the CT values of the second pixel.

9. The image generation device according to claim 8, wherein correcting the inferred virtual monochromatic X-ray image of the first energy includes:

gamma-correcting the inferred virtual monochromatic X-ray image of the first energy based on the CT values of the first pixel and the CT values of the second pixel.

10. The image generation device according to claim 1, wherein the trained model is generated by training a neural network with training data that includes images obtained by pre-processing virtual monochromatic X-ray images of the first energy and pre-processing virtual monochromatic X-ray images of the second energy.

11. The image generation device according to claim 1, wherein the first energy is lower than the second energy.

12. A medical device including one or a plurality of processors capable of performing operations including:

reconstructing a virtual monochromatic X-ray image of a first energy and a virtual monochromatic X-ray image of a second energy based on data collected from an imaging subject;

inputting an input image created based on the reconstructed virtual monochromatic X-ray image of the second energy into a trained model;

inferring the virtual monochromatic X-ray image of the first energy using the trained model; and generating a corrected virtual monochromatic X-ray image of the first energy based on the reconstructed virtual monochromatic X-ray image of the first energy and the inferred virtual monochromatic X-ray image of the first energy, wherein generating the corrected virtual monochromatic X-ray image of the first energy includes:

weighting CT values of each pixel of the reconstructed virtual monochromatic X-ray image of the first energy;

weighting the CT values of each pixel of the inferred virtual monochromatic X-ray image of the first energy; and generating a corrected virtual monochromatic X-ray image of the first energy based on the weighted reconstructed virtual monochromatic X-ray image of the first energy and weighted inferred virtual monochromatic X-ray image of the first energy; and identifying, from a virtual monochromatic X-ray image of a first of the reconstructed virtual monochromatic X-ray image and inferred virtual monochromatic X-ray image, a first region including pixels with CT values in a first range and a second region including pixels with CT values in a second range;

identifying, from a virtual monochromatic X-ray image of a second of the reconstructed virtual monochromatic X-ray image and inferred virtual monochromatic X-ray image, a third region corresponding to the first region and a fourth region corresponding to the second region;

determining a first weighting coefficient for weighting the CT values of the pixels in the first region, a second weighting coefficient for weighting the CT values of the pixels in the second region, a third weighting coefficient for weighting the CT values of the pixels in the third region, and a fourth weighting coefficient for weighting the CT values of the pixels in the fourth region;

weighting a first virtual monochromatic X-ray image with the first weighting coefficient and second weighting coefficient;

weighting a second virtual monochromatic X-ray image with the third weighting coefficient and fourth weighting coefficient; and generating a corrected virtual monochromatic X-ray image of the first energy based on the first virtual monochromatic X-ray image weighted by the first weighting coefficient and second weighting coefficient and the second virtual monochromatic X-ray image weighted by the third weighting coefficient and fourth weighting coefficient.

13. A storage medium readable by a computer and non-transitory containing one or more instructions executable by one or more processors, wherein the one or more instructions instruct the one or more processors to perform operations including:

reconstructing a virtual monochromatic X-ray image of a first energy and a virtual monochromatic X-ray image of a second energy based on data collected from an imaging subject;

creating an input image based on the reconstructed virtual monochromatic X-ray image of the second energy;

inputting the input image to a trained model and use the trained model to infer a virtual monochromatic X-ray image of the first energy; and generating a corrected virtual monochromatic X-ray image of the first energy based on the reconstructed virtual monochromatic X-ray image of the first energy and the inferred virtual monochromatic X-ray image of the first energy, wherein generating the corrected virtual monochromatic X-ray image of the first energy includes:

weighting CT values of each pixel of the reconstructed virtual monochromatic X-ray image of the first energy;

weighting the CT values of each pixel of the inferred virtual monochromatic X-ray image of the first energy; and generating a corrected virtual monochromatic X-ray image of the first energy based on the weighted reconstructed virtual monochromatic X-ray image of the first energy and weighted inferred virtual monochromatic X-ray image of the first energy; and identifying, from a virtual monochromatic X-ray image of a first of the reconstructed virtual monochromatic X-ray image and inferred virtual monochromatic X-ray image, a first region including pixels with CT values in a first range and a second region including pixels with CT values in a second range;

identifying, from a virtual monochromatic X-ray image of a second of the reconstructed virtual monochromatic X-ray image and inferred virtual monochromatic X-ray image, a third region corresponding to the first region and a fourth region corresponding to the second region;

determining a first weighting coefficient for weighting the CT values of the pixels in the first region, a second weighting coefficient for weighting the CT values of the pixels in the second region, a third weighting coefficient for weighting the CT values of the pixels in the third region, and a fourth weighting coefficient for weighting the CT values of the pixels in the fourth region;

weighting a first virtual monochromatic X-ray image with the first weighting coefficient and second weighting coefficient;

weighting a second virtual monochromatic X-ray image with the third weighting coefficient and fourth weighting coefficient; and generating a corrected virtual monochromatic X-ray image of the first energy based on the first virtual monochromatic X-ray image weighted by the first weighting coefficient and second weighting coefficient and the second virtual monochromatic X-ray image weighted by the third weighting coefficient and fourth weighting coefficient.

* * * * *